May 3, 1949.  R. F. SHEA  2,469,213
RECORDING SYSTEM
Filed March 20, 1944
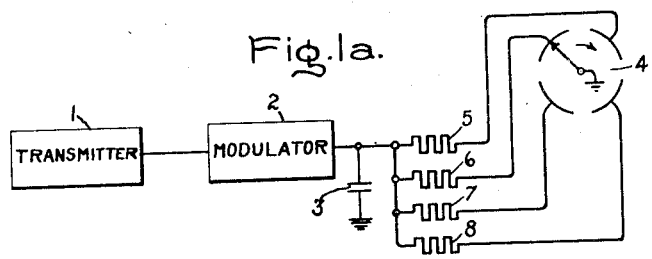
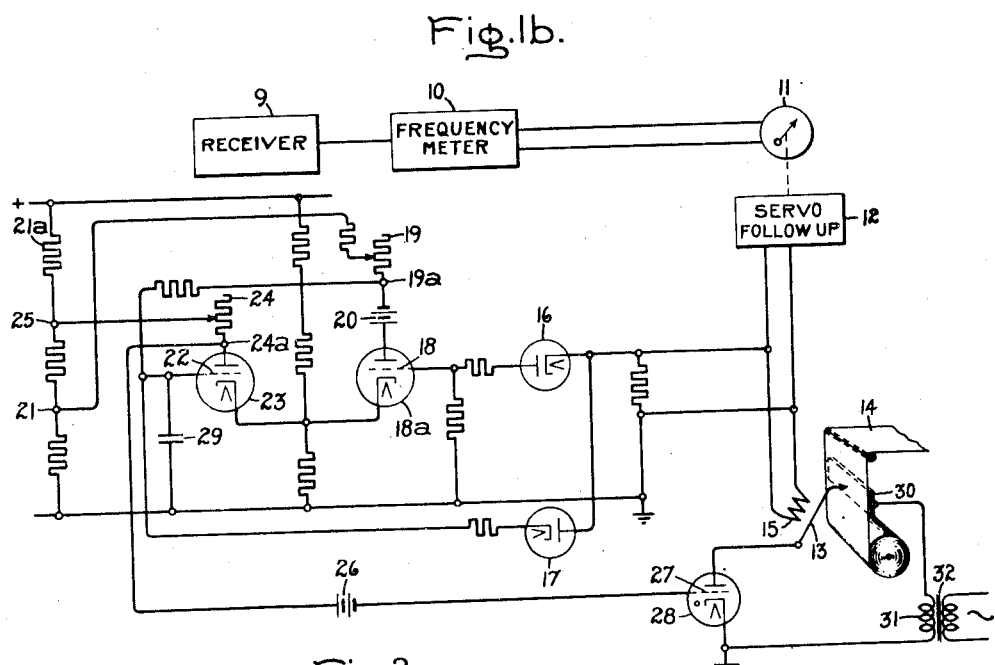
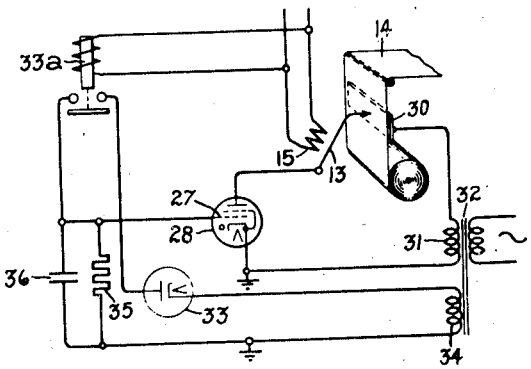
Inventor:
Richard F. Shea,
by Harry E. Dunham
His Attorney.

Patented May 3, 1949

2,469,213

UNITED STATES PATENT OFFICE 2,469,213

RECORDING SYSTEM

Richard F. Shea, Bridgeport, Conn., assignor to General Electric Company, a corporation of New York Application March 20, 1944, Serial No. 527,187

7 Claims. (Cl. 346—33)

The present invention relates to a recording system using a single recording device for making a continuous record of successive instantaneous values of a plurality of quantities.

An object of my invention is to provide an improved arrangement for preventing recording except at the measured values of the respective quantities so the record of the transitions of the recording device between these values is eliminated.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Figs. 1a and 1b are diagrams of a system embodying my invention; and Fig. 2 is a modification for substitution in Fig. 1b.

Referring to the drawing there is shown a recording system having a radiosonde transmitter 1 modulated by a blocking oscillator 2 in which the blocking rate (the modulation frequency) is determined by the time constants of an RC circuit comprising a condenser 3 connected by a commutator 4 sequentially in parallel with resistances 5, 6, 7, and 8, the resistances 5, 6, and 7 being respectively responsive to temperature, pressure, and humidity and the resistance 8 being a reference or calibrating resistance. The transmitter output consists of successive series of signals repeated at the frequency of rotation of the commutator (e. g. 30 R. P. M.). Each series is made up of sequential signals having modulation frequencies serving as a measure of the instantaneous values of the quantities to which the respective resistances respond. The transmitter, modulator, and resistances are intended to be carried by a balloon to transmit this information to a ground station.

The ground station has a receiver 9 in which the signals are demodulated. The audio output of the receiver is fed to a frequency meter 10, which produces currents corresponding to the respective modulation frequencies. These currents are fed to a micro-ammeter 11 connected through a servo follow-up 12 to a stylus 13 for marking a record sheet 14 which is moved past the stylus at the desired recording speed. The stylus 13 has a deflection coil 15 which is supplied from the servo follow-up with a deflecting voltage tending to deflect the stylus to a position corresponding to the ammeter deflection. This voltage varies in magnitude and sign with the amount and direction the position of the stylus differs from the ammeter deflection and is zero only when the position of the stylus corresponds exactly to the ammeter deflection. The equipment thus far described is well known in the art. The servo follow-up mechanism may be, for example, of the type employed in the General Electric Company high speed photoelectric recorder, certain features of which are described and claimed in United States Patent 1,897,850, granted February 14, 1933, to Cramer W. LaPierre. In such a servo follow-up, when the stylus 13 is in a position corresponding to the position of a needle or indicator of the ammeter 11, no current flows in the coil 15. When the stylus 13 is slightly to the right or left of its correct position, current flows through coil 15 in a direction to move stylus 13 to the left or right, as the case may be, to bring the stylus to a position corresponding to that of ammeter 11.

During each revolution of the commutator, the ammeter 11 is moved to successive positions corresponding to the measured values of the respective quantities and the stylus 13 is moved to corresponding positions. If the stylus were at all times effective to mark the record sheet, the record would contain not only marks corresponding to these measured values, but would also contain marks corresponding to the transitional movement of the stylus which are of no useful significance.

In the present system only the significant positions of the stylus are recorded on the record sheet. This is accomplished by circuits which interrupt recording while the stylus is moving between these positions. The circuits utilize the voltage in the stylus deflection coil 15 which is zero only when the position of the stylus corresponds to the ammeter deflection and is either positive or negative at all other times. The follow-up which is responsive to deviations of the stylus position from the ammeter deflection is sensitive enough so the stylus substantially exactly follows the normal rate of variation of the ammeter deflection while measuring any one of the quantities. However, when the ammeter is shifted to measure another quantity, their is a sudden change in the ammeter deflection, faster than the rate at which the follow-up can move the stylus, so there is a voltage in the deflection coil until the stylus reaches the position corresponding to the new ammeter deflection. Accordingly there is a voltage in the deflection coil each time the commutator 4 changes the transmitter modulation frequency by changing the resistance connected in the frequency determining circuit of the modulator 2. The deflection coil voltage is fed through diodes 16 and 17, respectively poled to pass negative and positive voltages. A negative voltage in the deflection coil is fed through the diode 16 to the grid 18 of an amplifier 18a having an adjustable output resistance 19 connected in series with a source of voltage 20 to a tap 21 on a voltage divider 21a. When the voltage in the deflection coil is zero the drop across the output resistance is adjusted to exactly balance the voltage at the tap 21 and the potential at point 19a is accordingly zero. Whenever there is a negative voltage in the deflection coil, the drop through the output resistance decreases and the potential at point 19a becomes positive. The point 19a and the diode 17 are connected to the grid 22 of an amplifier 23 so the grid 22 is driven positive by either a positive or a negative voltage in the deflection coil. The amplifier 23 has an output resistance 24 connected to a tap 25 on the voltage divider 21a and the voltage at point 24a (the voltage at terminal 25 minus the drop in resistance 24) is connected in series with a source of voltage 26 (of opposite polarity) to the grid 27 of a gaseous discharge device 28. The voltage 26 is chosen so that the device 28 is conducting whenever there is no voltage in the deflection coil 15. Any voltage in the deflection coil causes an increase in the voltage drop across the resistance 24 which results in a negative or cut-off bias on the grid 27 of the device 28. A condenser 29 is connected to the grid 22 to hold the positive bias on the amplifier for a short time (less than the time the commutator is connected to any one of the resistances 5—8) after the voltage in the deflection coil disappears so the cut-off bias on the grid 27 is not removed until the ammeter and stylus have settled down to a steady deflection.

The device 28 is connected in series with the stylus 13, which operates as a movable electrode, a stationary electrode 30 on the under side of the paper 14, and the secondary 31 of a transformer 32 connected to an A.-C power supply. The recording is produced by the reaction of the current flowing through the paper with the material with which the paper is treated. Since a cut-off bias is applied to the device 28 at each change of the ammeter deflection and is held for a short time after the stylus has moved to a position corresponding to the new ammeter deflection, current flow through the device is prevented except when the stylus position corresponds to the quantities being measured. Because the device 28 is a gaseous discharge device, the grid bias has no control while current is flowing but the current is interrupted during the first negative half cycle of the power supply voltage following the application of the cut-off bias. The frequency of the power supply is high enough so this delay is negligible.

During each revolution of the commutator 4 (every two seconds if the commutator rotates at 30 R. P. M.) a sequence of signals is transmitted, each having a modulation frequency corresponding to the instantaneous value of the quantity to be measured. In the receiver 9, the signals are demodulated and fed to the ammeter 11 which is deflected to successive positions corresponding to the values of these quantities. By means of the follow-up 12, a deflection voltage is produced which is of the proper magnitude and sign to cause the stylus 13 to follow the ammeter deflection. The deflection voltage, which disappears after the stylus position corresponds exactly to the ammeter deflection, produces a cut-off bias for the device 28 which interrupts the recording while the stylus is moving between the positions corresponding to the quantities being measured. The complete record therefore consists of a series of points forming continuous curves, each curve representing the values of one of the quantities. The accuracy of these curves obviously depends upon the rate at which the quantities vary and the speed of rotation of the commutator. By making the speed of rotation of the commutator fast compared to the normal rate of variation of the quantities, an effectively continuous record is obtained.

In Fig. 2 is a modification of the bias control circuits for the device 28 which may be substituted in Fig. 1b. In this circuit, the voltage in the deflection coil 15 (positive or negative) actuates a normally open relay 33a which connects a rectifier 33 in series with a winding 34 on the transformer 32 and a resistance 35. The rectifier is poled to develop a negative voltage (cut-off bias) across the resistance which is applied to the grid 27 of the device 28. The cut-off bias is applied to the device 28 while the relay 33a is closed and for a short time after the relay opens, this additional time being determined by a condenser 36 shunting the resistance 35. The relay 33a opens when the voltage in the deflection coil disappears (when the stylus position corresponds exactly to the ammeter deflection) and a short time thereafter the cut-off bias is removed from the device 28 which conducts producing a mark corresponding to the value of the quantity being measured. In other respects the operation is unchanged.

What I claim as new and desire to secure by Letters Patent of the United States is:

1. In a recorder for producing substantially continuous records of a plurality of quantities, means for receiving successive series of impulses, the series being made up of separate impulses corresponding to the respective quantities, said receiving means having an element movable to positions corresponding to the respective impulses, a stylus for marking a record, a deflecting coil for the stylus, means for providing a voltage in the coil deflecting the stylus to a position corresponding to the instantaneous position of the element, and means responsive to the voltage in said coil for interrupting the marking by the stylus until the position of the stylus corresponds to the position of the element.

2. In a recorder for producing substantially continuous records of a plurality of quantities, means for producing a current varying in value in accordance with said quantities, measuring means having a movable element responsive successively to current impulses corresponding to instantaneous values of said quantities, means including a stylus for marking a record, a deflection coil for moving said stylus, means energizing the coil to move said stylus toward positions corresponding to the positions of said element, and means responsive to the energizing of the coil for interrupting the marking of said stylus until the positions of said stylus and said element correspond.

3. In a recorder for producing substantially continuous records of a plurality of quantities, measuring means having a movable element responsive successively to impulses corresponding to instantaneous values of said quantities, means including a stylus for marking a record, follow-up means and a deflecting coil for moving said stylus to positions corresponding with said element, and means responsive to the deviation of the positions of the stylus and said element for producing a current in said coil and interrupting the marking unitl the positions of said stylus and said element correspond.

4. A high speed electronic recorder for producing records of a plurality of variable quantities comprising an element movable to successive positions corresponding to the instantaneous values of said quantities, means including a stylus for marking a record, means responsive to movement of said movable element comprising a deflection coil for moving said stylus to successive positions corresponding to the positions of said element, means responsive to the difference in positions of said stylus and said element for impressing a voltage across said coil, and means responsive to the voltage across said coil for interrupting said marking means.

5. A high speed electronic recorder comprising an element movable to successive positions corresponding to a plurality of quantities to be measured, means for marking a record comprising a pair of electrodes and means for impressing a voltage across said electrodes, means including a deflecting coil for moving one of said electrodes to successive positions corresponding to the positions of said element, and means responsive to current in said coil for removing said voltage from said electrodes when said one electrode and said element are not in corresponding positions.

6. A high speed electronic recorder comprising an element movable to successive positions corresponding to a plurality of quantities to be measured, means for marking a record comprising a pair of electrodes, means including an electric discharge device for impressing a voltage across said electrodes, said device having a control electrode, means including a deflecting coil for moving one of said pair of electrodes to successive positions corresponding to the positions of said element, and means responsive to current in said coil for supplying a negative potential to said control electrode when said one electrode and said element are not in corresponding positions whereby marking of said record is interrupted.

7. In an apparatus for intermittently recording a plurality of variable quantities on a single record strip, means having a movable element for indicating successively the instantaneous values of said quantities, recording means comprising a stylus adapted to mark said strip and a coil for deflecting said stylus, follow-up means for supplying current to said coil to move said stylus to a position corresponding to the position of said element, the current in said coil being a minimum when said stylus is in a position corresponding to that of said element, and means responsive to the current in said coil for interrupting the marking of said strip by said stylus when said current exceeds said minimum value.

RICHARD F. SHEA.

REFERENCES CITED

The following references are of record in the file of this patent:

UNITED STATES PATENTS

| Number | Name | Date |
|---|---|---|
| 1,641,199 | Roucka | Sept. 6, 1927 |
| 1,929,241 | Franklin | Oct. 3, 1933 |
| 2,027,945 | Widmer | Jan. 14, 1936 |
| 2,207,343 | Fairchild | July 9, 1940 |
| 2,232,589 | Chappell | Feb. 18, 1941 |
| 2,340,880 | Keinath | Feb. 8, 1944 |
| 2,351,081 | Swift | June 13, 1944 |